United States Patent [19]

Akiyama et al.

[11] Patent Number: 5,361,674

[45] Date of Patent: Nov. 8, 1994

[54] BRAIDING APPARATUS FOR A TUBULAR BRAID STRUCTURE

[75] Inventors: Yasuo Akiyama, Kyoto; Zenichiro Maekawa, Amagasaki; Hiroyuki Hamada, Shiga; Atsushi Yokoyama, Tsu, all of Japan

[73] Assignee: Murata Kikai Kabushiki Kaisha, Kyoto, Japan

[21] Appl. No.: 138,985

[22] Filed: Oct. 21, 1993

Related U.S. Application Data

[62] Division of Ser. No. 962,293, Oct. 16, 1992.

[30] Foreign Application Priority Data

Oct. 18, 1991 [JP] Japan .................. 3-299763

[51] Int. Cl.⁵ .................................................. D04C 1/00
[52] U.S. Cl. .................................................. 87/9; 87/1
[58] Field of Search .................. 87/1, 6, 8, 9, 11, 29, 87/33, 34, 36, 41, 62

[56] References Cited

U.S. PATENT DOCUMENTS

| | | | |
|---|---|---|---|
| 1,830,196 | 11/1931 | Faure-Roux | 87/29 |
| 3,586,058 | 6/1971 | Ahrens et al. | 87/9 X |
| 4,519,290 | 5/1985 | Inman et al. | 87/34 X |
| 5,203,249 | 4/1993 | Adams | 87/34 |

*Primary Examiner*—Joseph J. Hail, III
*Attorney, Agent, or Firm*—Spensley Horn Jubas & Lubitz

[57] ABSTRACT

The apparatus comprises a tubular braid machine, a mandrel having branched portions, a holding body for the mandrel capable of effecting upward movement, downward movement, horizontal movement about a braiding point or rotation within a vertical surface, an annular guide detachably mounted at a braiding position to a mandrel main portion, an annular guide detachably mounted at a braiding position to a mandrel branch portion, and a closeable annular guide detachably mounted therebelow.

13 Claims, 10 Drawing Sheets

BRAIDING APPARATUS FOR A TUBULAR BRAID STRUCTURE

This is a division of application Ser. No. 07/962,293, filed on Oct. 16, 1992.

BACKGROUND OF THE INVENTION

1. Field of the Invention

This invention relates to a braiding apparatus for a tubular braid structure, for example, such as a Y-shape, which principally uses a core of fiber reinforced plastic (hereinafter referred to as FRP) using a thermosetting resin or a fiber reinforced plastic (hereinafter referred to as FRTP) using a thermoplastic resin and has portions branched in plural at a small angle from a main portion.

2. Related Art Statement

There have been already proposed by the present applicant methods and apparatus which use a tubular braid machine having a relatively large annular guide disposed in a central portion and upwardly thereof and in which a mandrel is raised, lowered or rotated to braid a fiber bundle on the surface of a T-shaped or a cross-shaped mandrel to produce a T-shape or a cross-shape tubular braid structure (see Japanese Patent Application Nos. 223852/1990, 296984/1990, etc.).

A tubular braid structure of a Y-shape or the like having portions branched in plural at a small angle from a main portion could not be braided by the aforementioned braiding apparatus for a tubular braid structure.

OBJECT AND SUMMARY OF THE INVENTION

It is an object of this invention to provide an apparatus for braiding a tubular braid structure for FRP which has portions branched in plural at a small angle from a main portion and in which tubular bodies are integrated each other at said branched points.

For achieving the aforesaid object, the braiding apparatus for a tubular braid structure according to this invention comprises a tubular braid machine, a mandrel having branched portions, a holding body for the mandrel capable of effecting upward movement, downward movement, horizontal movement about a braiding point or rotation within a vertical surface, an annular guide detachably mounted at a braiding position to a mandrel main portion, an annular guide detachably mounted at a braiding position to a mandrel branch portion, and an openable and closeable annular guide detachably mounted therebelow.

In the braiding apparatus for a tubular braid structure configured as described above, the holding body is horizontally moved about a braiding point or rotated within a vertical surface whereby a braiding object position is selected. The braiding to the respective portions of the mandrel is accomplished by mounting an exclusive-use annular guide at a braiding position, further mounting an annular guide therebelow at the time of braiding the mandrel branched portions, and moving up or down the holding body.

DETAILED DESCRIPTION OF PREFERRED EMBODIMENT

Figure 1:
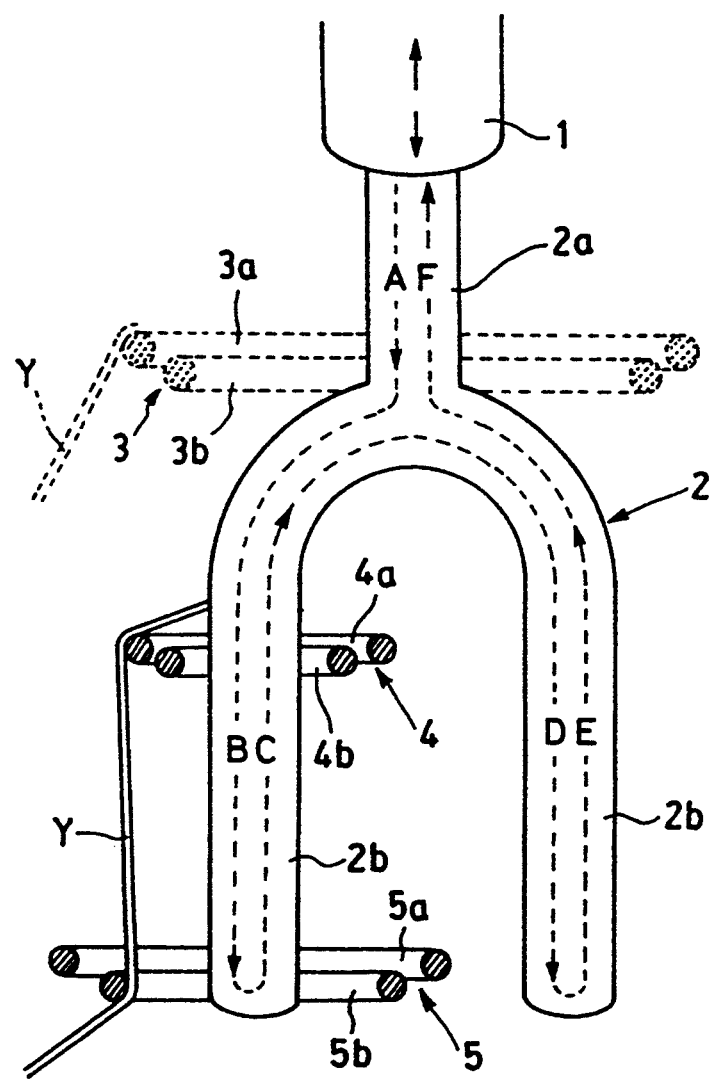
FIG. 1 is a partially cutway view of a main portion of the apparatus according to this invention.
Figure 2:
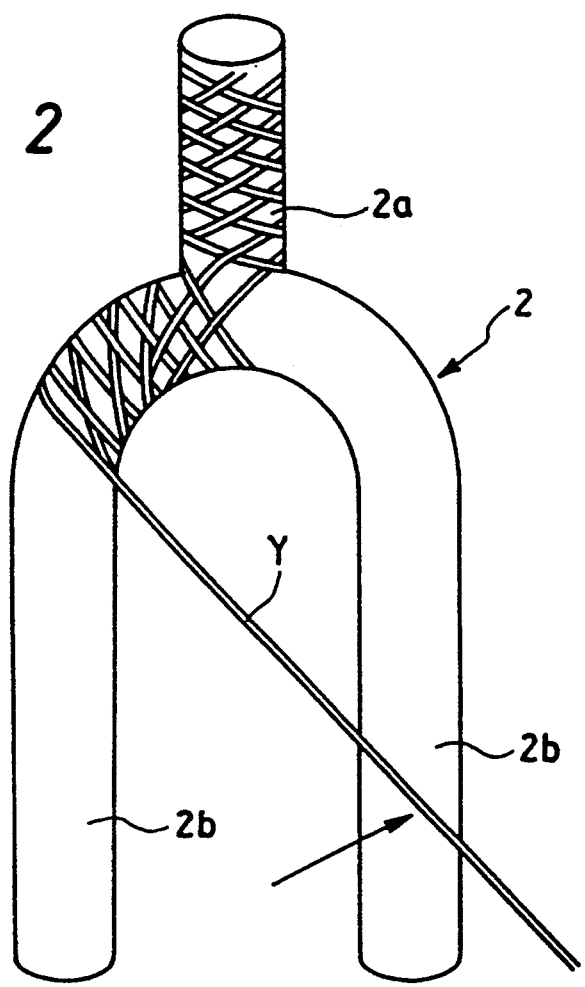
FIG. 2 is a view for explaining troubles which occur in a case where a Y-shape tubular braid structure is braided without providing an auxiliary annular guide.

Embodiments of the braiding apparatus for a tubular braid structure according to this invention will be described hereinbelow with reference to FIGS. 1 to 23.

This braiding apparatus is composed of a tubular braid machine, a holding body 1 for holding a mandrel 2, an annular guide 3 at a main portion position, an annular guide 4 at a branch position and an auxiliary annular guide 5.

The elastic braiding machine is of a machine generally used (which is therefore omitted to be shown in the drawing), in which the braiding is carried out in a manner such that plural sets of bobbin carriers complexly travel leftward or rightward along the annular orbit formed on a disk. Fiber bundles taken out of bobbins mounted on the bobbin carriers are combined on the mandrel position in the center of and upwardly of the annular orbit. The bobbin carriers are fed while being rotated by the drive gears located below the disk. By changing the ratio between the moving speed of the bobbin carriers and the raising or lowering speed of the mandrel, braids which are different in winding angle from each other can be produced.

The mandrel 2 used herein is one which is obtained by joining a plastic cylinder into a Y-shape, which has two portions 2b branched at a small angle from a main portion 2a as shown in FIG. 1.

The holding body 1 is arranged above the tubular braid machine so that the holding body 1 can be moved upward and downward and can be horizontally moved about the braiding point that is, an intersection indicated by the longitudinal and lateral phantom lines shown in FIGS. 4 to 13, or rotated within the vertical plane.

Figure 3:
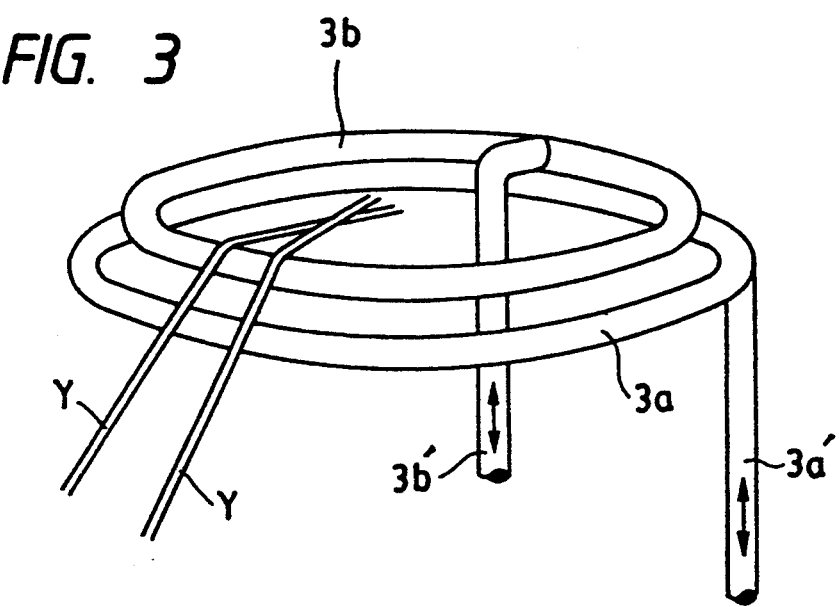
FIG. 3 is a perspective view of an annular guide at a main portion position.

The annular guide 3 at the main portion position is provided to guide the fiber bundle Y to be braided when the braiding on the mandrel main portion 2a is carried out, and two rings 3a and 3b slightly different in diameter are arranged at the same height, horizontally and concentrically. As shown in FIG. 3, the rings 3a and 3b are detachably supported on shafts 3a' and 3b', respectively, which vibrate in directions opposite to each other, vertically or horizontally or in a complex direction. When the mandrel main portion 2a is braided, the rings 3a and 3b are mounted on the vibrating shafts 3a' and 3b'. During the braiding, the fiber bundles Y which move in the reverse direction repeatedly cross and climb over on the annular guide 3 at the main portion position, the climbing-over is smoothly carried out by the vibrations of the rings 3a and 3b through the vibrating shafts 3a' and 3b'. If the shaft is vibrated vertically or horizontally or in the complex direction, the annular guide 3 at the main portion position can be constituted by a single ring.

The annular guide 4 at the branch portion position is provided to guide the fiber bundle Y to be braided when the braiding is carried out for the mandrel branch portion 2b, the annular guide 4 is of the structure similar to the annular guide 3 at the main portion position except a small diameter. When the mandrel branch portion 2b is braided, the rings 4a and 4b are mounted on their vibrating shafts and removed therefrom when the braiding is shifted to the other mandrel branch portion 2b. Also in the annular guide 4 at the branch portion position, the climbing-over of the fiber bundle Y which moves in the reverse direction is promoted.

The auxiliary annular guide 5 is also used when the mandrel branch portion 2b is braided, and is required because the mandrel 2 has the Y-shape. That is, when the braiding is carried out without provision of the auxiliary annular guide 5, the fiber bundle Y comes into contact with the righthand branch portion 2b indicated at arrow in FIG. 2 to make the braiding impossible. To avoid this, it is necessary to move down the fiber bundle Y from the lower end of the branch portion 2b. To execute this, in the present invention, the auxiliary annular guide 5 is mounted on the lower end of the mandrel branch portion 2b at the braiding position, as shown in FIG. 1. This auxiliary annular guide 5 is of the construction substantially similar to the annular guide 3 at the main portion position and has rings 5a and 5b. In the auxiliary annular guide 5, the rings 5a and 5b can be divided into two and opened so that the fiber bundle Y to be braided can pass through the rings 5a and 5b, as shown in FIG. 1.

Figure 4:
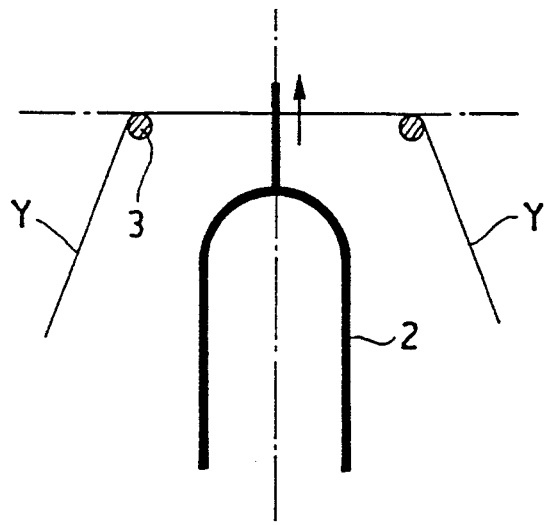
FIG. 4 is a schematic view showing one process of braiding to a tuning fork type mandrel.
Figure 5:
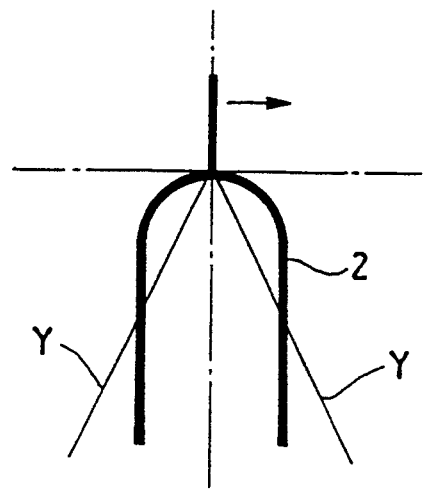
FIG. 5 is a schematic view showing one process of braiding to a tuning fork type mandrel.
Figure 6:
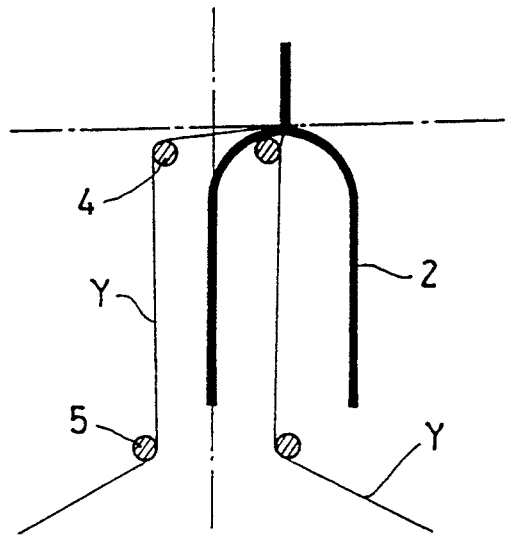
FIG. 6 is a schematic view showing one process of braiding to a tuning fork type mandrel.
Figure 7:
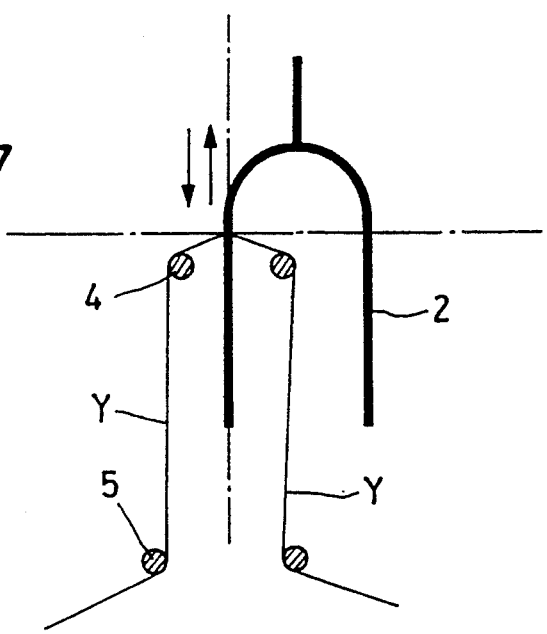
FIG. 7 is a schematic view showing one process of braiding to a tuning fork type mandrel.
Figure 8:
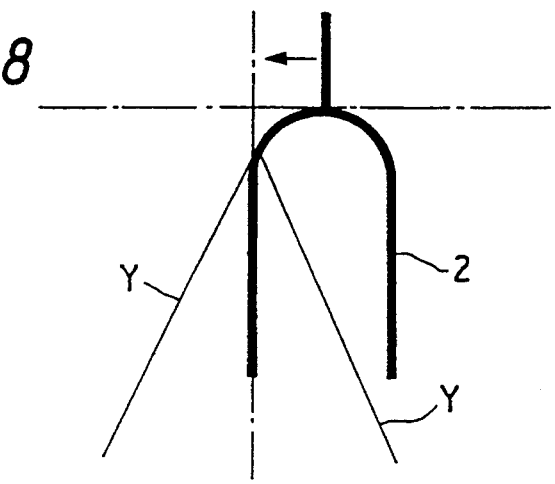
FIG. 8 is a schematic view showing one process of braiding to a tuning fork type mandrel.
Figure 9:
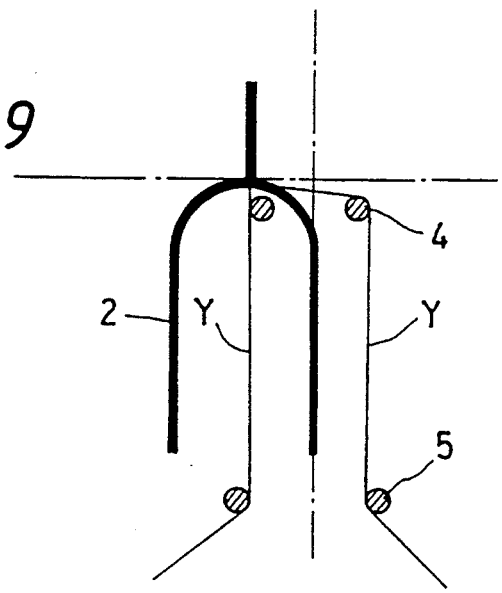
FIG. 9 is a schematic view showing one process of braiding to a tuning fork type mandrel.
Figure 10:
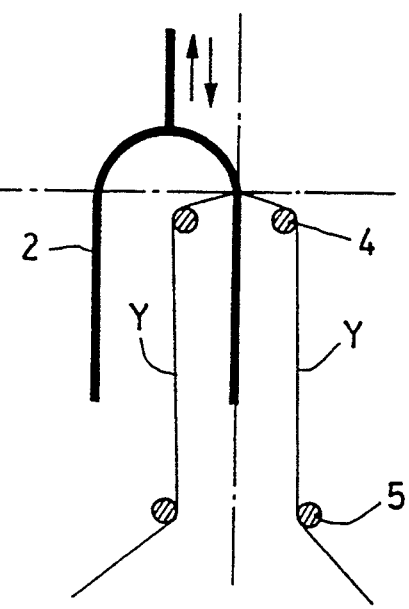
FIG. 10 is a schematic view showing one process of braiding to a tuning fork type mandrel.
Figure 11:
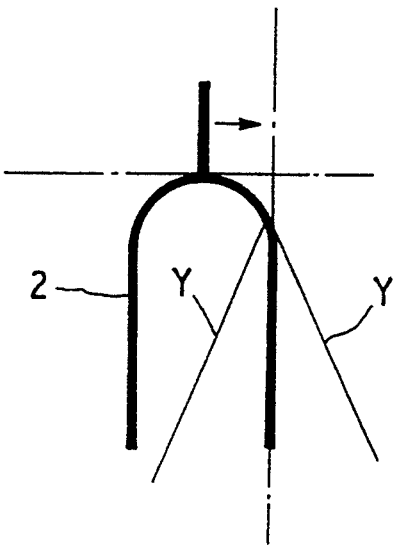
FIG. 11 is a schematic view showing one process of braiding to a tuning fork type mandrel.
Figure 12:
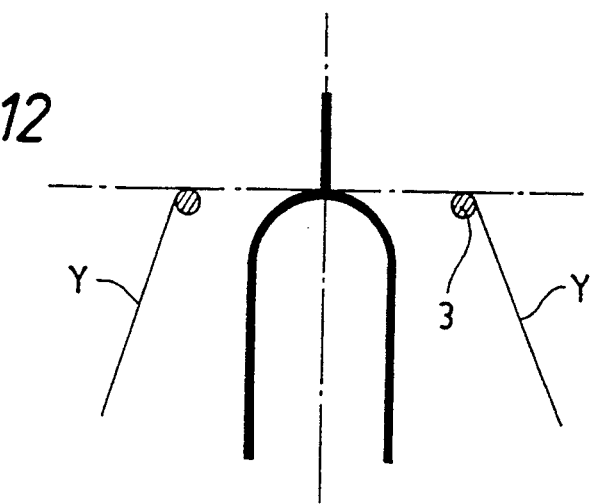
FIG. 12 is a schematic view showing one process of braiding to a tuning fork type mandrel.
Figure 13:
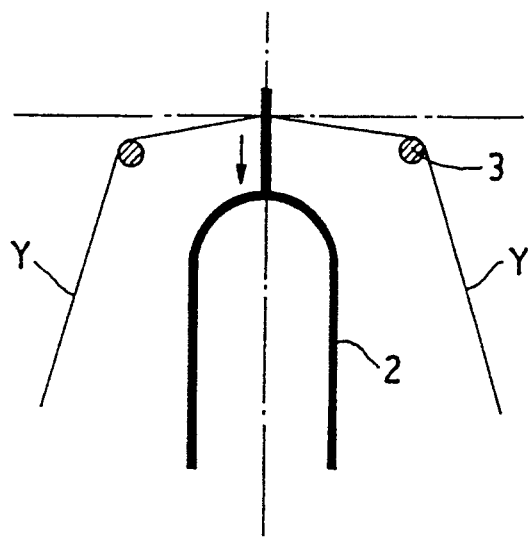
FIG. 13 is a schematic view showing one process of braiding to a tuning fork type mandrel.

Arrows A to F indicated by the dotted lines in FIG. 1 show the braiding order for the mandrel surface. The braiding to the mandrel 2 of a tuning fork type is as shown in FIGS. 4 to 13 (an intersection indicated by longitudinal and lateral phantom lines is a braiding point). First, as shown in FIG. 4, after the annular guide 3 at the main portion position has been mounted at a predetermined position, the braiding of the mandrel main portion 2a is carried out while moving upward the holding body 1. Thereafter, as shown in FIG. 5, the annular guide 3 at the main portion position is removed and the holding body 1 is then moved rightward through a predetermined distance, and as shown in FIG. 6, the annular guide 4 at the branch portion position and the auxiliary annular guide 5 are mounted at a predetermined position to guide the fiber bundle Y. Then, as shown in FIG. 7, the left-hand mandrel branch portion 2a is reciprocatingly moved while moving upward the holding body 1 and then moving down it. Subsequently, as shown in FIG. 8, the annular guide 4 at the branch portion position and the auxiliary annular guide 5 are removed and the holding body 1 is moved leftward through a predetermined distance. Thereafter, as shown in FIG. 9, the annular guide 4 at the branch portion position and the auxiliary guide 5 are mounted, and the reciprocating braiding of the other mandrel branch portion 2b is carried out as shown in FIG. 10. Then, as shown in FIG. 11, the annular guide 4 at the branch portion position and tile auxiliary annular guide 5 are removed and the holding body 1 is moved leftward through a predetermined distance, and as shown in FIG. 12, the annular guide 3 at the main portion position is mounted, and as shown in FIG. 13, the mandrel main portion 2a is braided while moving down the holding body 1 to complete a series of braiding. The thus braided Y-shape tubular braid structure is of a double layer structure. The braiding order is not limited to that described in the aforementioned example but the braiding may be carried out from the extreme end side of the mandrel branch portion 26.

Figure 14:
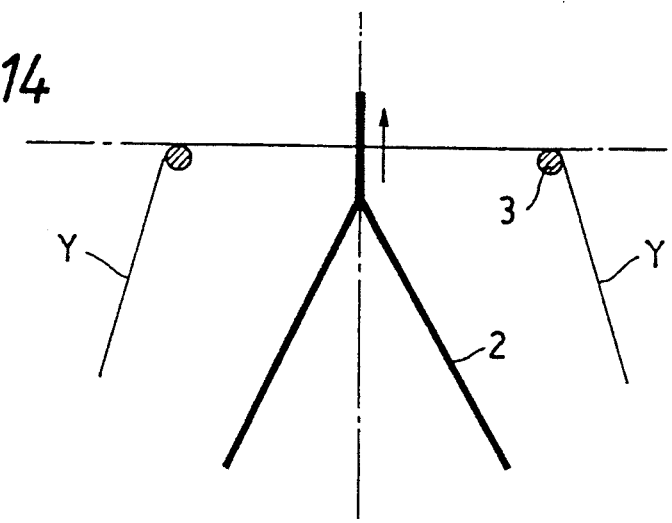
FIG. 14 is a schematic view showing one process of braiding to a Y-shape type mandrel.
Figure 15:
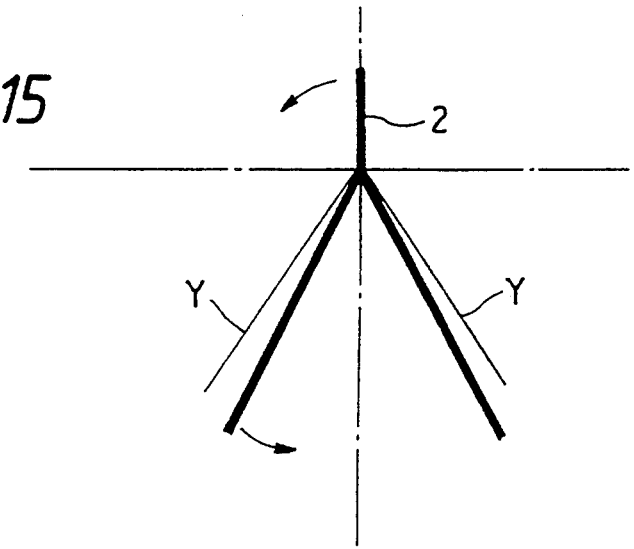
FIG. 15 is a schematic view showing one process of braiding to a Y-shape type mandrel.
Figure 16:
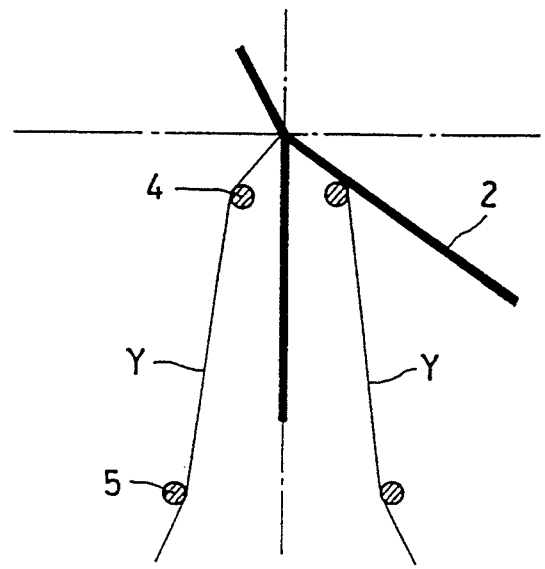
FIG. 16 is a schematic view showing one process of braiding to a Y-shape type mandrel.
Figure 17:
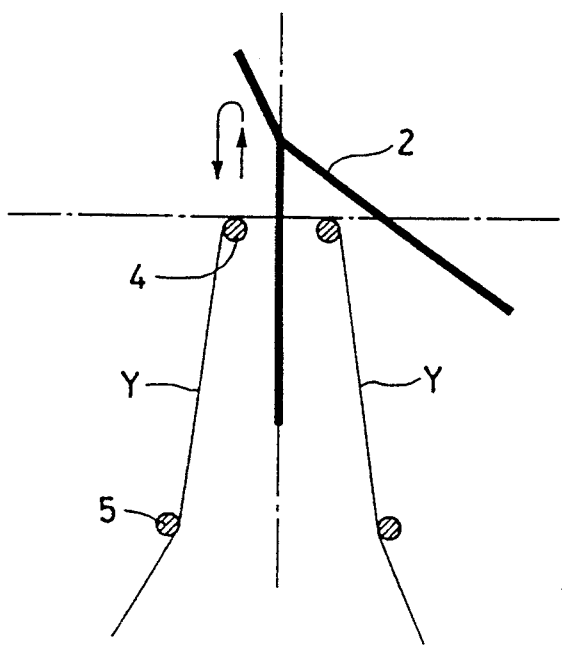
FIG. 17 is a schematic view showing one process of braiding to a Y-shape type mandrel.
Figure 18:
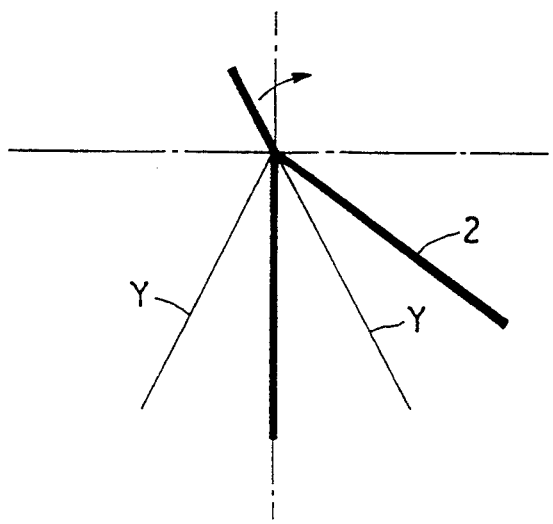
FIG. 18 is a schematic view showing one process of braiding to a Y-shape type mandrel.
Figure 19:
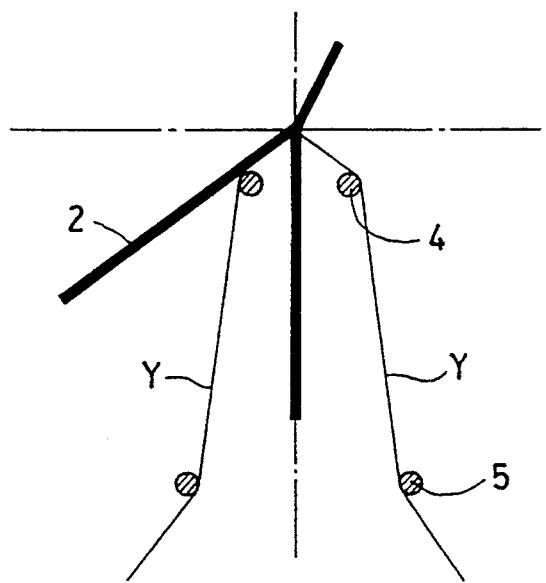
FIG. 19 is a schematic view showing one process of braiding to a Y-shape type mandrel.
Figure 20:
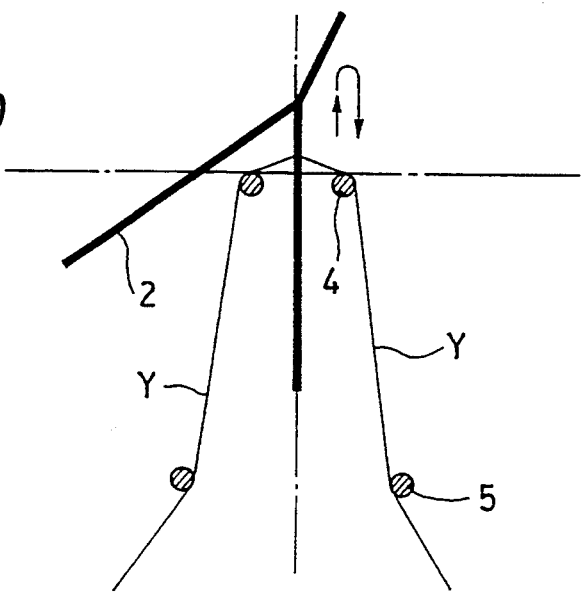
FIG. 20 is a schematic view showing one process of braiding to a Y-shape type mandrel.
Figure 21:
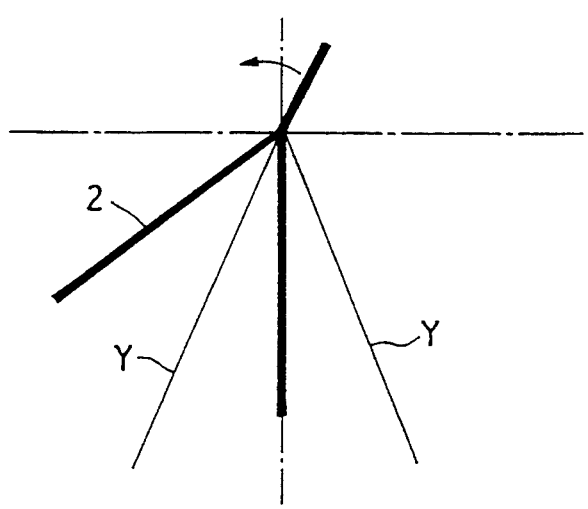
FIG. 21 is a schematic view showing one process of braiding to a Y-shape type mandrel.
Figure 22:
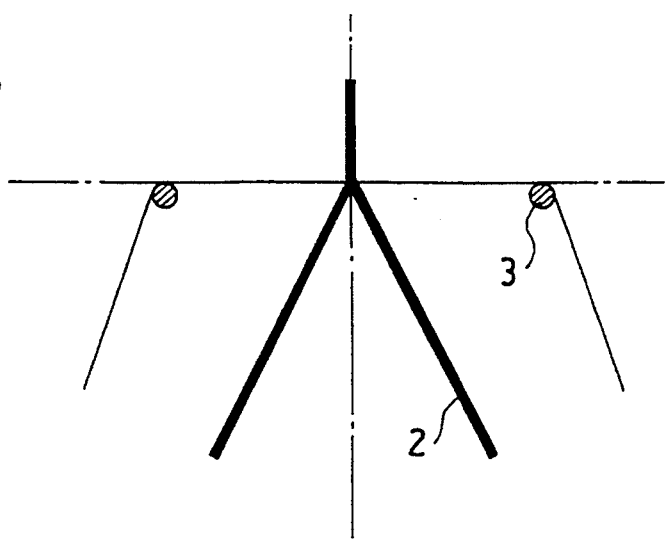
FIG. 22 is a schematic view showing one process of braiding to a Y-shape type mandrel.
Figure 23:
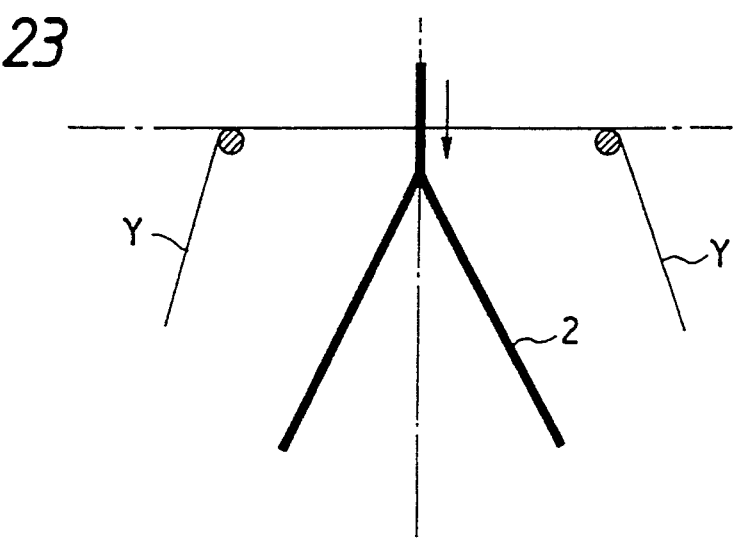
FIG. 23 is a schematic view showing one process of braiding to a Y-shape type mandrel.

Further, the braiding to the mandrel 2 having a literally Y-shape among the same Y-shape mandrels is as shown in FIGS. 14 to 23 (an intersection indicated by the longitudinal and lateral phantom lines is a braiding point). First, as shown in FIG. 14, the annular guide 3 at the main portion position is mounted, after which the braiding of the mandrel main portion 2a is carried out while moving upward the holding body 1. Thereafter, as shown in FIG. 15, the annular guide 3 at the main portion position is removed, and then the holding body 1 is rotated counterclockwise through a predetermined angle, and as shown in FIG. 16, the annular guide 4 at the branch portion position and the auxiliary annular guide 5 are mounted at a predetermined position to guide the fiber bundle Y. And, as shown in Fig. 17, the reciprocating braiding of the left-hand mandrel branch portion 2a is carried out while moving upward the holding body 1 and then moving downward it. Subsequently, as shown in FIG. 18, the annular guide 4 at the branch portion position and the auxiliary guide 5 are removed, and the holding body 1 is rotated clockwise through a predetermined angle. Thereafter, as shown in FIG. 19, the annular guide 4 at the branch portion position and the auxiliary annular guide 5 are mounted, and as shown in FIG. 20, the reciprocating braiding of the other mandrel branch portion 2b is carried out. And, as shown in FIG. 21, the annular guide 4 at the branch portion position and the auxiliary annular guide 5 are removed to rotate the holding body 1 counterclockwise through a predetermined angle, and as shown in FIG. 22, the annular guide 3 at the main portion position is mounted, and as shown in FIG. 23, the mandrel main portion 2a is braided while moving downward the holding body 1 to complete a series of braiding.

The thus produced Y-shape tubular braid structure is covered by the mandrel 2, in which state, the resin immersed and coated externally by a conventional manner. Thereafter, the mandrel 2 is removed and the internal surface is processed and completed. Further, if a foamed body is used for the mandrel 2, the mandrel 2 can be used as it is without being removed.

In a case where the mandrel 2 is formed from a rigid body, it is difficult to remove the mandrel 2 from the Y-shape tubular braid structure, and therefore, the mandrel 2 may be devised in advance as follows. That is, (a) the mandrel is made of the construction capable of being disassembled; (b) in case of FRTP, the mandrel is made of thermoplastic resin which is sufficiently lower in softening temperature than that of molded resin, and the mandrel is heated, softened and eluded after molding; and (c) the mandrel is made of a water soluble material, and the mandrel is washed with water and removed after molding.

The braiding of the Y-shape tubular braid structure has been described. However, even in a tubular braid structure having three branch portions or more, the shape of the mandrel and the manner by which the holding body 1 is moved horizontally about the braiding point and rotated within the vertical plane are somewhat devised to provide a similar braiding.

Figure 24:
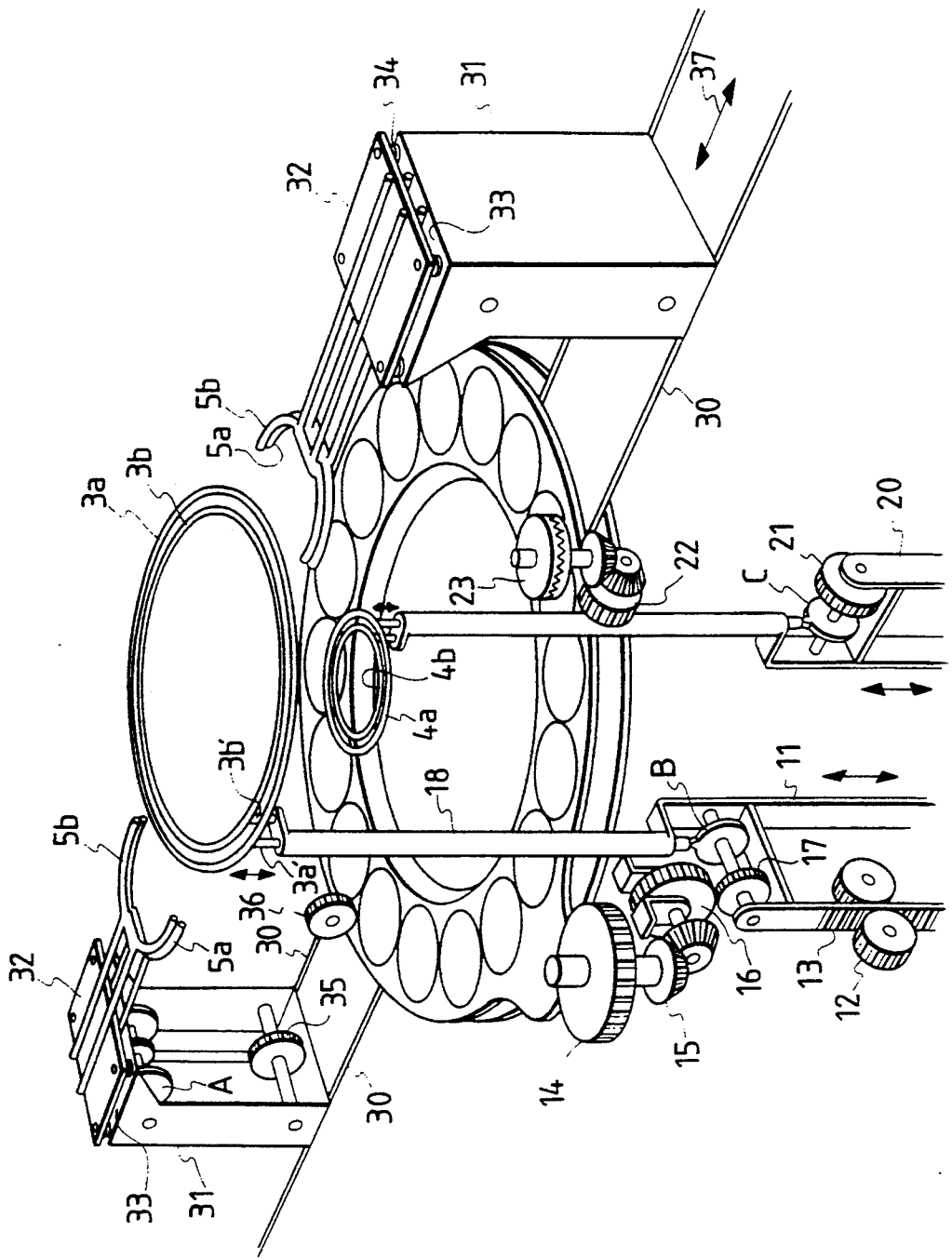
FIG. 24 is a perspective view showing schematical whole construction of a braiding apparatus for a tubular braid structure according to this invention.

Now, referring to FIG. 24, one embodiment of the braiding apparatus for a tubular braid structure of this invention will be illustrated.

The shafts 3b' of the ring 3b is secured on an upper end of a cylindrical member 18 supported on an elevatable frame 11 and the shaft 3a' supporting the ring 3a is put on a cam B through an inner hole of the cylindrical member 18. The cam B supported on the frame 11 is turned by a gear at the bobbin orbit side (not shown) through a gear 14, bevel gears 15, a gear 16 and a gear 17. The shaft 3a' is moved up or down due to the turning motion of the cam B and the ring 3a is vibrated in the vertical direction. The frame 11 can be elevated by the driving means such as a pinion 12 and a rack 13, and the like.

The second rings 4a, 4b are similarly constructed as ill the case of the rings 3a and 3b. The ring 4a is vibrated in the vertical direction due to the turning motion of a cam C. Though a gear 21 of a frame 20 is separated away from a gear 22 at the bobbin orbit side in FIG. 24, the gear 21 and gear 22 are meshed with each other when the frame 20 is elevated.

The third rings 5a and 5b consist of a pair of semicircular members which may be openable or separatable, and are supported on a frame 31 which is advanced or retracted in a direction shown by an arrow 37 on a rail 30. On the frame 31, a lower plate 33 and an upper plate 32 are provided, and the lower plate 33 is secured on the frame 31 while the upper plate 32 is urged downward by means of springs 34. The ring 5b is secured to the upper plate 32 and the ring 5a is secured to the lower plate 33. The upper plate 32 comes to be contacted with a cam A. When the frame 31 is moved to a position where a gear 35 is meshed with a gear 36, the cam A is turned to move the upper plate 32, so that the ring 5b secured to the upper plate 32 is vibrated in the vertical direction.

Being configured as described above, this invention has the advantageous effects as mentioned below.

That is, a tubular braid structure having portions branched in plural at a small angle from a main portion can be simply produced. Further, the produced tubular braid structure is high in strength at a branch position and can be sufficiently practically used as a core for FRP and FRTP.

What is claimed is:

1. A method of forming a tubular braided structure from continuous strands on a mandrel, the mandrel having an end portion and first and second portions defining a junction, the method comprising the steps of:

moving the mandrel linearly relative to a braiding axis with the first portion of the mandrel being substantially coaxial with the braiding axis and braiding the strands on the first portion at a braiding location during said movement;

rotating the mandrel generally about the junction when the braiding approximately reaches the junction to bring the second portion of the mandrel into substantially coaxial alignment with the axis;

moving the mandrel linearly relative to the axis in the same direction as in the first step and braiding the strands on the second portion at a braiding location during said movement;

holding the end portion of the mandrel by a holding body continuously during the steps of moving and rotating the mandrel; and continuously maintaining the end portion of the mandrel held by the holding body outside the braiding location during the steps of moving and rotating the mandrel.

2. The method of claim 1, wherein each of the first and second portions has a central axis, the method further comprising the step of:

braiding the strands on the first portion of the mandrel while guiding the strands generally symmetrically about the central axis of the first portion; and braiding the strands on the second portion of the mandrel while guiding the strands generally symmetrically about the central axis of the second portion.

3. The method of claim 1, wherein the mandrel is a generally Y-shaped mandrel.

4. A method of forming a tubular braided structure from continuous strands on a mandrel, the mandrel having first and second portions defining a junction, each of the first and second portions having a central axis, the method comprising the steps of:

moving the mandrel linearly relative to a braiding axis with the first portion of the mandrel being substantially coaxial with the braiding axis and braiding the strands on the first portion during said movement;

rotating the mandrel generally about the junction when the braiding approximately reaches the junction to bring the second portion of the mandrel into substantially coaxial alignment with the axis;

moving the mandrel linearly relative to the axis in the same direction as in the first step and braiding the strands on the second portion during said movement, braiding the strands on the first portion of the mandrel while guiding the strands generally symmetrically about the central axis of the first portion; and braiding the strands on second portion of the mandrel while guiding the strands generally symmetrically about the central axis of the second portion;

positioning a first annular braiding guide for guiding the strands to the first portion; and positioning a second annular braiding guide for guiding the strands to the second portion of the mandrel, the second annular braiding guide having a diameter smaller than that of the first annular braiding guide.

5. The method of claim 4 further comprising the step of:

positioning an auxiliary annular braiding guide for guiding the strands to the second annular braiding guide, the auxiliary annular braiding guide having a diameter smaller than that of the first annular braiding guide.

6. A method of forming a tubular braided structure from continuous strands on a mandrel, the mandrel having an end portion and first and second portions defining a junction, the method comprising the steps of:

moving the mandrel linearly relative to a braiding axis with the first portion of the mandrel being substantially coaxial with the braiding axis and braiding the strands on the first portion at a braiding location during said movement;

moving the mandrel in a direction transverse to the braiding axis when the braiding approximately reaches the junction to bring the second portion of the mandrel into substantially coaxial alignment with the axis; and moving the mandrel linearly relative to the axis in the same direction as in the first step and braiding the strands on the second portion at a braiding location during said movement;

holding the end portion of the mandrel by a holding body continuously during the steps of moving and rotating the mandrel; and continuously maintaining the end portion of the mandrel held by the holding body outside the braiding location during the steps of moving and rotating the mandrel.

7. The method of claim 6, wherein each of the first and second portions has a central axis, the method further comprising the step of:

braiding the strands on the first portion of the mandrel while guiding the strands generally symmetrically about the central axis of the first portion; and braiding the strands on the second portion of the mandrel while guiding the strands generally symmetrically about the central axis of the second portion.

8. The method of claim 6, wherein the mandrel comprises a substantially U-shaped mandrel.

9. A method of forming a tubular braided structure from continuous strands on a mandrel the mandrel having first and second portions defining a junction, each of the first and second portions having a central axis, the method comprising the steps of:

moving the mandrel linearly relative to a braiding axis with the first portion of the mandrel being substantially coaxial with the braiding axis and braiding the strands on the first portion during said movement;

moving the mandrel in a direction transverse to the braiding axis when the braiding approximately reaches the junction to bring the second portion of the mandrel into substantially coaxial alignment with the axis;

moving the mandrel linearly relative to the axis in the same direction as in the first step and braiding the strands on the second portion during said movements;

braiding the strands on the first portion of the mandrel while guiding the strands generally symmetrically about the central axis of the first portion;

braiding the strands on the second portion of the mandrel while guiding the strands generally symmetrically about the central axis of the second portion;

positioning a first annular guide for guiding the strands to the first portion; and positioning a second annular guide for guiding the strands to the second portion of the mandrel, the second annular guide having a diameter smaller than that of the first annular guide.

10. The method of claim 9 further comprising the step of:

positioning an auxiliary annular guide for guiding the strands to the second annular guide, the auxiliary annular guide having a diameter smaller than that of the first annular guide.

11. A method of forming a tubular braided structure from continuous strands on a mandrel, the mandrel having an end portion and first and second portions defining a junction, the method comprising the steps of:

moving the mandrel along a braiding axis with the first portion being substantially coaxial with the braiding axis and braiding the strands on the first portion at a braiding location during said movement;

positioning the mandrel when the braiding approximately reaches the junction to bring the second portion of the mandrel into substantially coaxial alignment with the axis;

moving the mandrel along the axis in the same direction as in the first step and braiding the strands on the second portion at a braiding location during said movement;

holding the end portion of the mandrel by a holding body continuously during the steps of moving and rotating the mandrel; and continuously maintaining the end portion of the mandrel held by the holding body outside the braiding location during the steps of moving and rotating the mandrel.

12. The method of claim 11 further comprising the steps of:

braiding the strands on the first portion of the mandrel while guiding the strands generally symmetrically about the central axis of the first portion; and braiding the strands on the second portion of the mandrel while guiding the strands generally symmetrically about the central axis of the second portion.

13. A method of forming a tubular braided structure from continuous strands on a mandrel, the mandrel having first and second portions defining a junction, the method comprising the steps of:

moving the mandrel along a braiding axis with the first portion being substantially coaxial with the braiding axis and braiding the strands on the first portion during said movement;

positioning the mandrel when the braiding approximately reaches the junction to bring the second portion of the mandrel into substantially coaxial alignment with the axis;

moving the mandrel along the axis in the same direction as in the first step and braiding the strands on the second portion during said movement;

braiding the strands on the first portion of the mandrel while guiding the strands generally symmetrically about the central axis of the first portion;

braiding the strands on the second portion of the mandrel while guiding the strands generally symmetrically about the central axis of the second portion;

positioning a first annular braiding guide for guiding the strands to the first portion; and positioning a second annular braiding guide and a third annular braiding guide for guiding the strands to the second portion of the mandrel, each of the second annular braiding guide and the third annular braiding guide having a diameter smaller than that of the first annular guide.

* * * * *